(12) United States Patent
Mandella

(10) Patent No.: US 7,268,956 B2
(45) Date of Patent: Sep. 11, 2007

(54) SOLID CATADIOPTRIC LENS WITH TWO VIEWPOINTS

(75) Inventor: Michael J. Mandella, San Jose, CA (US)

(73) Assignee: Electronic Scripting Products, Inc., Palo Alto, CA (US)

(*) Notice: Subject to any disclaimer, the term of this patent is extended or adjusted under 35 U.S.C. 154(b) by 0 days.

(21) Appl. No.: 11/336,735

(22) Filed: Jan. 19, 2006

(65) Prior Publication Data

US 2006/0132907 A1    Jun. 22, 2006

Related U.S. Application Data

(63) Continuation-in-part of application No. 10/721,194, filed on Nov. 24, 2003, now Pat. No. 7,038,846.

(60) Provisional application No. 60/716,890, filed on Sep. 14, 2005.

(51) Int. Cl.
    *G02B 17/08* (2006.01)

(52) U.S. Cl. ............... 359/727; 359/362; 359/725; 359/726

(58) Field of Classification Search ........ 359/364–366, 359/362, 642, 709, 725–729, 712, 708
    See application file for complete search history.

(56) References Cited

U.S. PATENT DOCUMENTS

| | | | |
|---|---|---|---|
| 2,638,033 A | 5/1953 | Donald et al. ........... 359/725 |
| 3,361,512 A | 1/1968 | Fuller | |
| 3,505,465 A | 4/1970 | Rees | |
| 4,566,763 A | 1/1986 | Greguss ........... 359/725 |
| 4,655,555 A | 4/1987 | Machler et al. ........... 350/432 |
| 5,089,910 A | 2/1992 | Sigler ........... 359/399 |
| 5,191,469 A | 3/1993 | Margolis ........... 359/366 |
| 5,386,316 A | 1/1995 | Cook ........... 359/365 |
| 5,400,169 A | 3/1995 | Eden ........... 359/208 |
| 5,471,346 A | 11/1995 | Ames ........... 359/731 |
| 5,473,474 A | 12/1995 | Powell ........... 359/725 |
| 5,502,309 A | 3/1996 | Davis ........... 250/353 |
| 5,627,675 A | 5/1997 | Davis et al. ........... 359/366 |
| 5,631,770 A | 5/1997 | Jarmuz ........... 359/351 |
| 5,638,219 A | 6/1997 | Medina Puerta et al. ... 359/729 |
| 5,710,661 A | 1/1998 | Cook ........... 359/364 |
| 5,760,826 A | 6/1998 | Nayar ........... 348/36 |
| 5,841,574 A | 11/1998 | Willey ........... 359/351 |
| 5,841,589 A | 11/1998 | Davis et al. ........... 359/726 |
| 5,854,713 A | 12/1998 | Kuroda et al. ........... 359/850 |
| 5,920,337 A | 7/1999 | Glassman et al. ........... 348/36 |

(Continued)

*Primary Examiner*—Joshua L. Pritchett
(74) *Attorney, Agent, or Firm*—Lumen Intellectual Property Services, Inc.

(57) ABSTRACT

A dual viewpoint solid catadioptric lens has a first spherical refractive surface S1 having a center C1 located on an optical axis of the lens and having a radius r1, and a second spherical refractive surface S2 having a center C2 located on the optical axis of the lens and having a radius r2<r1. The lens also has a first ellipsoidal reflective surface E1 with foci F1 and F1' on the optical axis of the lens, and a second ellipsoidal partially reflective surface E2 having foci F2 and F2' on the optical axis of the lens. Focus F1 coincides with C1, focus F2 conincides with C2, and focus F1' coincides with F2'. The points C1 and C2 provide dual viewpoints for the lens, which may be used in a variety of imaging applications.

19 Claims, 4 Drawing Sheets

U.S. PATENT DOCUMENTS

| | | |
|---|---|---|
| 5,940,222 A | 8/1999 | Sinclair et al. ............. 359/689 |
| 6,118,474 A | 9/2000 | Nayar ......................... 348/36 |
| 6,118,583 A | 9/2000 | Rogers ....................... 359/432 |
| 6,130,783 A | 10/2000 | Yagi et al. .................. 359/627 |
| 6,226,035 B1 | 5/2001 | Korein et al. ............... 348/335 |
| 6,262,760 B1 | 7/2001 | Glassman et al. ............ 348/36 |
| 6,304,285 B1 | 10/2001 | Geng .......................... 348/36 |
| 6,333,826 B1 | 12/2001 | Charles ...................... 359/725 |
| 6,356,296 B1 | 3/2002 | Driscoll, Jr. et al. .......... 348/36 |
| 6,412,961 B1 | 7/2002 | Hicks ......................... 359/846 |
| 6,449,103 B1 | 9/2002 | Charles ...................... 359/725 |
| 6,462,889 B1 | 10/2002 | Jackson ...................... 359/728 |
| 6,542,184 B1 | 4/2003 | Driscoll, Jr. et al. ..... 348/211.3 |
| 6,583,815 B1 | 6/2003 | Driscoll, Jr. et al. ..... 348/211.3 |
| 6,611,282 B1 | 8/2003 | Trubko et al. ................ 348/36 |
| 6,789,908 B2 | 9/2004 | Garcia ........................ 359/859 |
| 2004/0156132 A1* | 8/2004 | Garcia ........................ 359/859 |

\* cited by examiner

SOLID CATADIOPTRIC LENS WITH TWO VIEWPOINTS

CROSS-REFERENCE TO RELATED APPLICATIONS

This application is a continuation-in-part of U.S. patent application Ser. No. 10/721,194, filed Nov. 24, 2003 now U.S. Pat. No. 7,038,846. This application also claims priority from U.S. Prov. Pat. Appl. No. 60/716,890, filed Sep. 14, 2005. Both applications are incorporated herein by reference.

FIELD OF THE INVENTION

The present invention relates generally to optical lenses, and more particularly to solid catadioptric lenses with two viewpoints.

BACKGROUND OF THE INVENTION

Catadioptric lenses are well-known in computer vision and imaging systems, robotic sensors, and various other applications. Each imaging application typically has specific design requirements, resulting in many different types of catadioptric lenses. Unfortunately, many wide-angle lenses and optical systems are complex and expensive.

For example, U.S. Pat. No. 6,449,103 discloses a variety of complicated wide-angle lens systems. U.S. Pat. No. 5,473,474 to Powell discloses a panoramic imaging system that is comparatively simple. One embodiment has two spherical refractive surfaces and a single elliptical reflective surface. It is not evident, however, that this system would be useful in certain machine vision applications since the design does not produce the important feature of a single view-point (SVP). The SVP feature can only be produced by a special class of catadioptric lenses and is important in machine vision applications, i.e., performing optical measurements of a scene, because it permits the distortion-free reconstruction of the image. U.S. Pat. No. 6,611,282 to Trubko et al. discloses a folded-type catadioptric lens having an SVP feature. This system would be useful for many machine vision applications, but would be limited in its use for optical ranging applications involving absolute measurement of distances unless two or more such lenses are used in stereo-vision or multiple-view systems that are well known in the art. It would be desirable to have a single, simple, compact, inexpensive lens with a wide field of view that is suitable for optical ranging and similar applications.

SUMMARY OF THE INVENTION

According to one aspect of the invention, a dual viewpoint solid catadioptric lens having the feature of two SVP's is provided. The lens has a first spherical refractive surface whose center is located on an optical axis of the lens. The lens also has a second, smaller spherical refractive surface whose center is also located on the optical axis of the lens. The lens has a first ellipsoidal reflective surface whose foci are on the optical axis of the lens and a second ellipsoidal partially reflective surface whose foci are also on the optical axis of the lens. Moreover, a focus of the first ellipoidal reflective surface is conicident with the center of the first spherical refractive surface. Similarly, a focus of the second ellipoidal reflective surface is conicident with the center of the second spherical refractive surface. In addition, the other foci of the two ellipses are coincident with each other.

Specific embodiments of the invention include variations of design parameters such as the field of view, eccentricities and sizes of the ellipsoidal surfaces, radii of curvature of the spherical refractive surfaces, additional light shaping surfaces, and so on.

DETAILED DESCRIPTION

Figure 1:
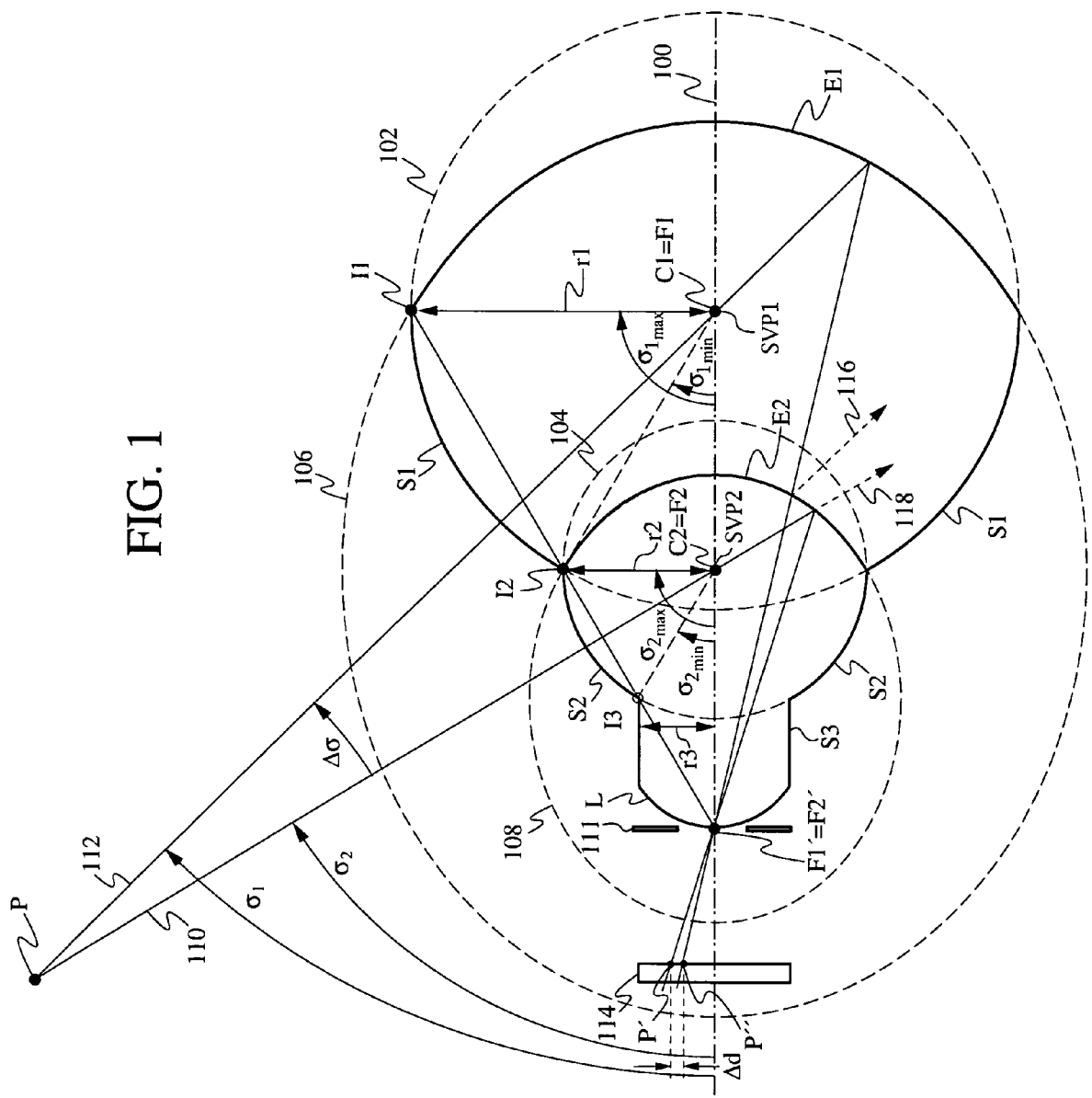
FIG. 1 is a cross-sectional view of a dual-viewpoint solid catadioptric lens according to an embodiment of the invention.

FIG. 1 is a cross-sectional view of a dual-viewpoint solid catadioptric lens according to an embodiment of the invention. The lens has a first spherical refractive surface S1 whose center C1 is located on an optical axis 100 of the lens. Surface S1 has a radius of curvature r1 which is the radius of dashed circle 102, which is shown in the figure to aid in the understanding of the lens geometry. The lens also has a second, smaller spherical refractive surface S2 whose center C2 is also located on the optical axis 100 of the lens. Surface S2 has a radius of curvature r2 which is the radius of circle 104. In this particular embodiment, the center C2 of the smaller circle 104 lies within the larger circle 102. In other words, the distance between centers C1 and C2 is less than radius r1. In other embodiments, the center C2 may lie outside the larger circle 102, i.e., the distance between C1 and C2 is greater than r1.

The lens has a first ellipsoidal reflective surface E1 whose foci F1 and F1' are both on the optical axis 100. In other embodiments, focus F1' lies on optical axis 100, but focus F1 does not lie on axis 100. The cross-section of surface E1 is a portion of dashed ellipse 106. Focus F1 is coincident with center C1. Consequently, rays passing through surface S1 at normal incidence will pass through C1=F1 and reflect from surface E1 directed toward focus F1'. The lens also has an ellipsoidal partially reflective surface E2 whose foci F2 and F2' are on the optical axis 100 of the lens. The cross-section of surface E2 is a portion of dashed ellipse 108. Focus F2 is coincident with center C2 and focus F2' is coincident with focus F1'. Consequently, rays passing through surface S2 at normal incidence will pass through C2=F2 and partially reflect from surface E2 directed toward focus F2'=F1'. Thus, C1 and C2 provide two viewpoints, denoted SPV1 and SPV2, for the lens.

Circle 102 intersects with ellipse 106 at point I1. In this particular embodiment, point I1 is directly above focus F1. Similarly, circle 104 intersects with ellipse 108 at point I2 directly above focus F2. Consequently, this embodiment provides a maximum view angle $\sigma1_{max}=\pi/2$ for SVP1 and $\sigma2_{max}=\pi/2$ for SVP2, where $\sigma1_{max}$ is the angle between the optical axis and the point of intersection of S1 and E1 as measured from C1, and $\sigma2_{max}$ is the angle between the optical axis and the point of intersection of S2 and E2 as measured from C2. Point I2 also is the point of intersection of circles 102 and 104 and thus defines the minimum view angle $\sigma1_{min}$ of SVP1 defined by $r2=r1 \sin(\sigma1_{min})$, i.e., ($\sigma1_{min}$ is the angle between the optical axis and the point of intersection of S2 and E2 as measured from C1. Circle 104 also intersects with surface S3 at point I3, which defines the minimum view angle $\sigma 2_{min}$ of SVP2 given by r3=r2 sin ($\sigma 2_{min}$), i.e., $\sigma 2_{min}$ is the angle between the optical axis and the point of intersection of S2 and S3 as measured from C2. Moreover, in this embodiment points I1, I2 and I3 are collinear with focus F1'=F2'.

This particular embodiment of the lens is a solid body of revolution about optic axis 100 and may be constructed from two or more solid sections to provide partially reflective surface E2 within the lens interior. It is also preferable for the sections to be made of materials that allow matching of the refractive index across surface E2 to prevent refraction of rays crossing this surface. In preferred embodiments, the interior of the lens has a uniform index of refraction. The lens sections can be molded using standard moldable optical materials such as Acrylic, polystyrene, or moldable glass. The surfaces are preferably coated with appropriate optical coatings to provide required reflective or transmission properties. For example, the ellisoidal surfaces can be coated with aluminum or other metal to provide proper reflectivity. Also, multilayer dielectric coatings can be used on surfaces E1, E2, S1, or S2 to provide reflectivities at certain wavelengths to provide different wavelengths to pass through SPV1 and SPV2 to the image detector 114. Methods for creating selective beamsplitting properties of the surfaces are well known in the art. Since surface E2 is located in the interior of the fully assembled lens, and since it must have some partially reflective properties to allow rays to pass from SVP1 to the image detector, then this surface can also serve as the mating surface between two solid molded lens sections that are properly coated. The lens sections can be attached using standard optical adhesives. It is also preferable that the lens sections have the same index of refraction to avoid any rays from being refracted at the interface between the sections. Other methods for fabricating the required optical surfaces and lens sections from various optical materials may include injection molding, diamond point turning, CNC polishing, Sol-Gel techniques, precision etching, lithography, or any other standard optical fabrication methods that are well known in the art.

In this embodiment a non-optical cylindrical surface S3 having a radius r3 extends the lens body from point I3 on surface S2 and is terminated by a light shaping surface L having a focal length f. Surface L could be, for example, a convex surface passing through F1'=F2' thereby causing a focused image of object point P to be projected onto image detector 114. In general, light shaping surface L may be curved or flat and is preferably designed to refract the pencil of rays for imaging purposes. It is also preferable to have an aperture stop 111 with fixed or variable dimensions positioned at F1'=F2' to control the numerical aperture and insure that the chief imaging rays pass through F1'=F2' thereby enforcing the condition that all chief imaging rays pass through SPV1 or SPV2. This is a result of the elliptical surfaces E1 and E2, which forms an image of the aperture stop 111 at both points F1 and F2. For example, in the present embodiment, rays are refracted at surface L so that they are directed to image detector 114.

Figure 2:
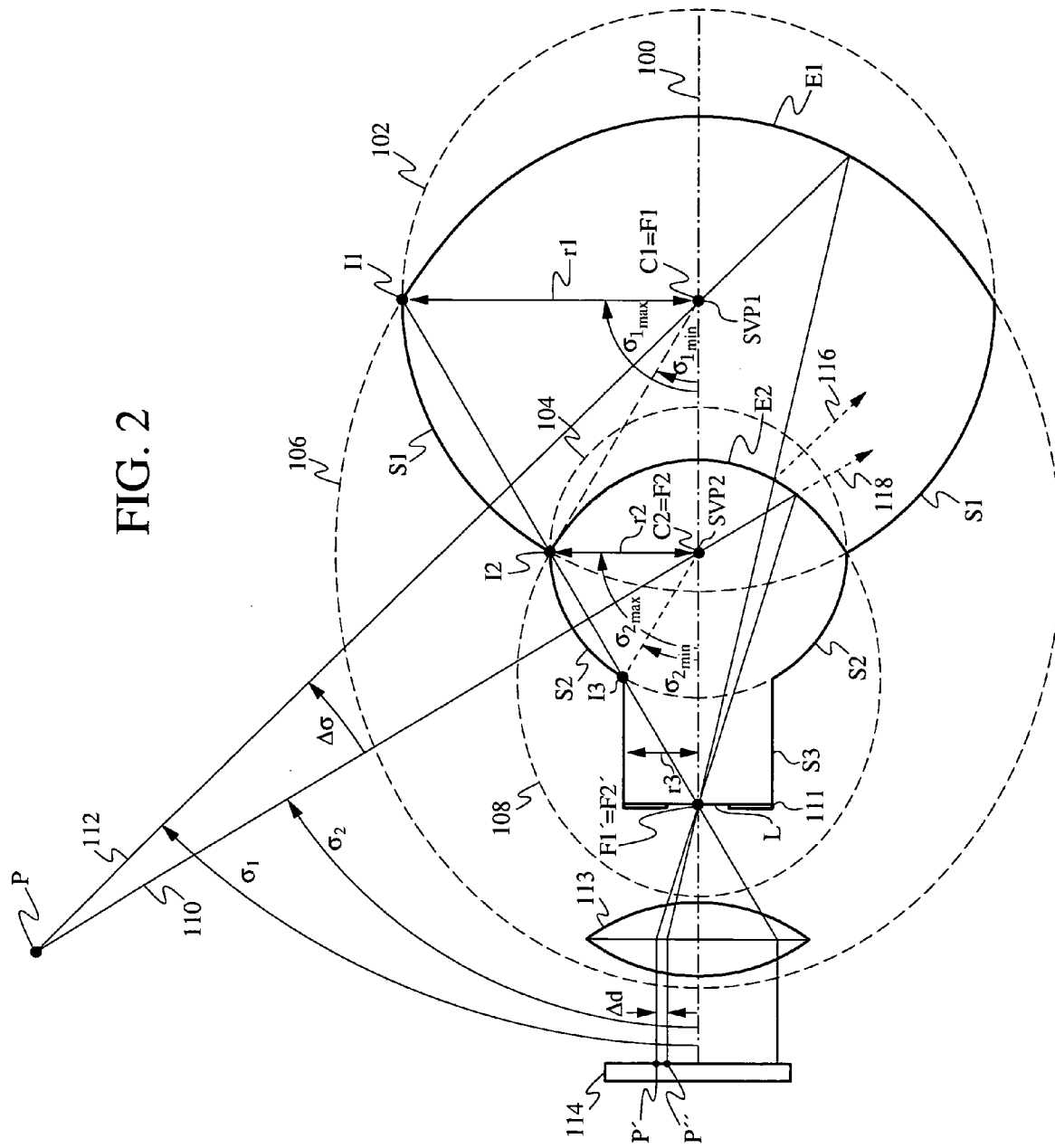
FIG. 2 is a cross-sectional view of an embodiment of the invention used with a relay lens and aperture.

In an alternate embodiment, shown in FIG. 2, light shaping surface L is flat and is positioned at point F along the optical axis 100. The lens in FIG. 2 is otherwise identical to that of FIG. 1. In addition, a relay lens 113 is provided to focus the rays upon the detector 114. Those skilled in the art will appreciate that many other optical configurations may be used to provide desired imaging of the rays exiting the lens.

In operation, consider an object point P which radiates light rays in all directions. However, from point P only two rays, 112 and 110, are normal to surfaces S1 and S2, respectively. Rays 112 and 110 therefore pass through focal points C1 and C2, respectively, and are then reflected from ellipsoidal surfaces E1 and E2, respectively, toward common focal point F1'=F2'. Light shaping surface L refracts the rays 110 and 112 before passing through an image relay lens 113, which has a focal length f and is placed between surface L and a detector 114 for forming images on detector 114 as points P' and P'', respectively. It is to be noted, however, that surface E2 is only partially reflective and may be constructed to divide a beam of light into a reflective component and a transmissive component using many well-known techniques for forming optical surfaces having beam-splitting functions, i.e., thin dielectric films for wavelength separation, or a thin metal coating for amplitude separation. Other methods for providing this partially reflective surface could include a thin air gap between two solid sections of lens body. Consequently, when ray 112 is transmitted through surface E2 toward common focal point F1'=F2' a portion 116 may be reflected from surface E2, thereby reducing the intensity of ray 112 that is imaged at point P''. Similarly, when ray 110 is reflected from surface E2 toward common focal point F1'=F2' a portion 118 may be transmitted through surface E2, thereby reducing the intensity of ray 110 that is imaged at point P'. The beam-splitting properties (i.e., partial reflectivity and partial transmissivity) of surface E2 is preferably selected to insure that the intensities of points P' and P'' are of the same order of magnitude.

The angle $\Delta\sigma$ between the two rays 110 and 112 originating from the object point P is related to the distance $\Delta d$ between the two points P' and P'' in the image. In particular, ray 112 makes an angle $\sigma 1$ with optical axis 100 as measured from point C1, while ray 110 makes an angle $\sigma 2$ with optical axis 100 as measured from point C2. The difference $\Delta\sigma=\sigma 2-\sigma 1$ is transformed by light shaping surface L and relay lens 113 into distance $\Delta d$ between points P' and P''. Thus, a measurement of the distance $\Delta d$ provides information about the angle $\Delta\sigma$. Moreover, the displacement of points P' and P'' from the optical axis 100 provides information about the values of angles $\sigma 1$ and $\sigma 2$. This information can then be used in optical ranging applications to determine position information of point P. For example, knowledge of angles $\sigma 1$, $\sigma 2$, and the distance between C1 and C2 allows the location of point P to be determined by triangulation. Moreover, if some information about point P is already known, that information can be used together with knowledge of angles $\sigma 1$ and $\sigma 2$ to more accurately determine location information about point P. For example, in some applications it may be known a priori that P lies in an object plane located at a predetermined distance from the lens along the optical axis. This constraint can be used to provide more accurate estimation of location information for P using knowledge of angles $\sigma 1$ and $\sigma 2$. If, in addition, the angle between the optical axis and the object plane is known, this information provides even more information which can be used to determine the location of point P with high accuracy. Conversely, location information of point P can be used to estimate the angle between the optical axis and the object plane.

Figure 3:
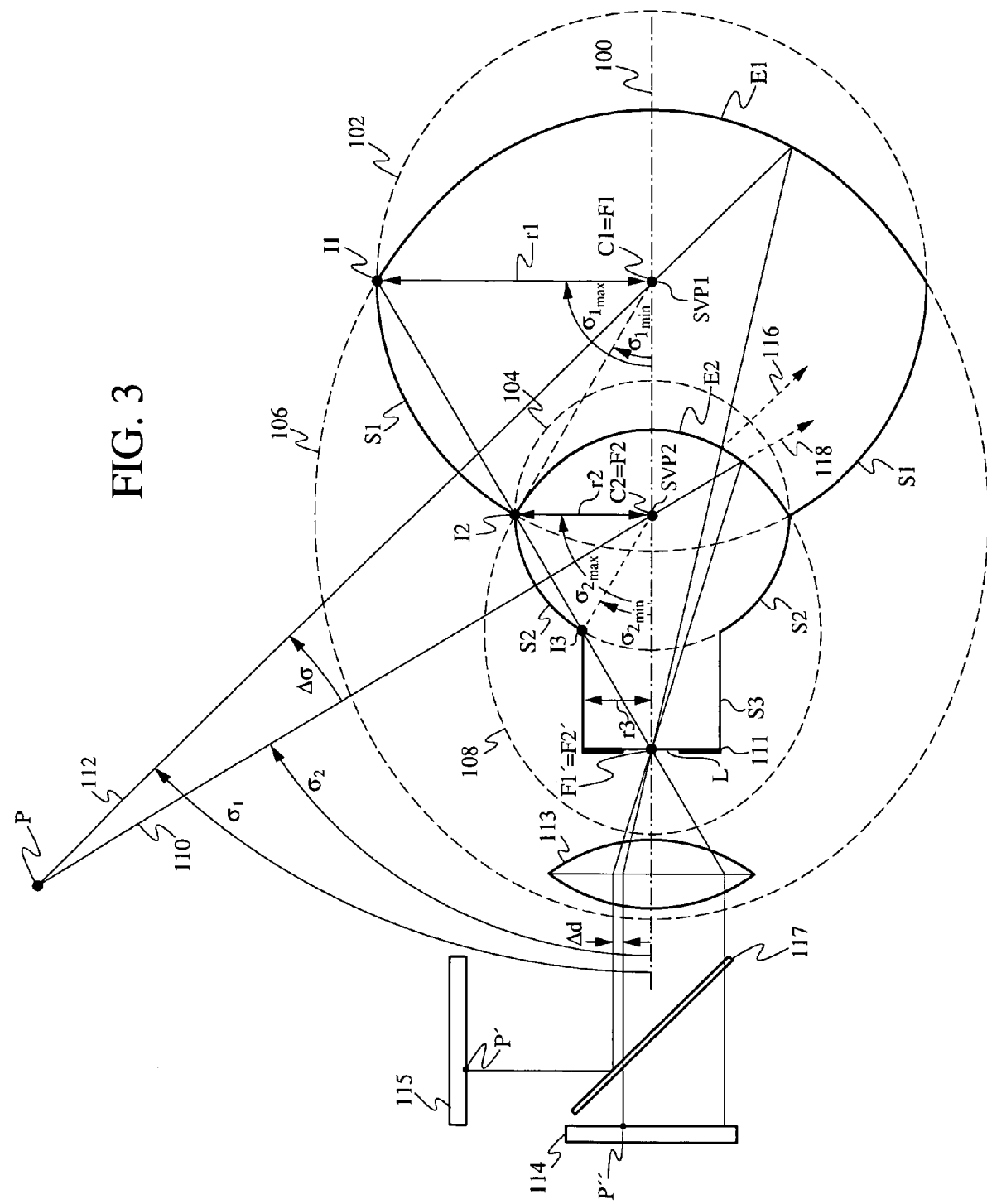
FIG. 3 is a cross-sectional view of an embodiment of the invention used with a wavelength selective beam splitter and two detectors.

In an alternate embodiment, the surfaces S1 and S2 are provided with different coatings which perform wavelength filtering. For example, the transmission spectra of the coatings on S1 and S2 could be centered at different wavelengths. Consequently, the detected wavelengths of image points P' and P'' can be used to determine which viewpoint the corresponding ray passed through. Additionally, partially reflective surface E2 may have properties such that only certain wavelengths (or a band of wavelengths) may be selected to pass through both S1 and E2, and whereby a different set of wavelengths can pass through S2 and also be reflected by E2. These wavelength selective properties of S1, S2, and E2 may be chosen to allow images P' and P" to be identified by a two distinctive sets of wavelengths. This would be useful when detector 114 can distiguish between the SVP-identifying wavelengths, such as a CCD array with a color filter mask (i.e., as used in typical color digital cameras). In another embodiment, illustrated in FIG. 3, detector 114 is a position sensitive detector (PSD) that can only track the position of a single point image. In this case, a wavelength selective beam splitter 117 may be used in the space between relay lens 113 and detector 114. Beam splitter 117 is designed to pass the image of P" onto detector (PSD) 114 while reflecting the image of P' onto a second detector (PSD) 115. Thus, if light emanating from object point P comprises a set of wavelengths such that some may pass through SVP2 and some through SVP1 to form respective point images P' and P" on detectors 114 and 115, then PSD detector 114 can independently track the movement of image point P" as viewed from SVP 1, and PSD detector 115 can independently track the movement of image point P' as viewed through SVP2. This type of optical ranging system can thus perform continuous distance ranging by triangulation as the object point P moves relative to the optical system.

Figure 4:
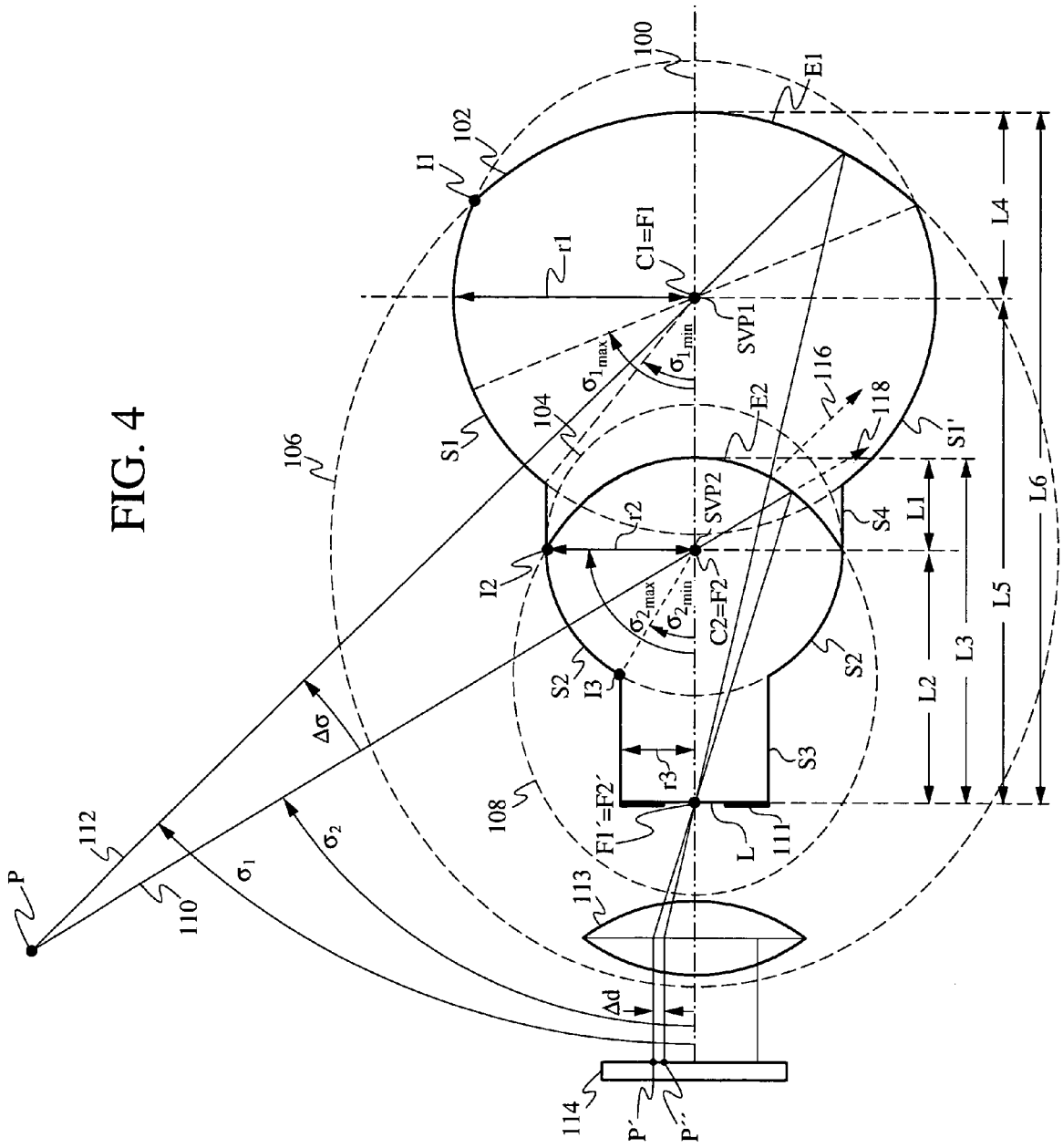
FIG. 4 is a cross-sectional view of an embodiment of the invention having less than maximal view angles.

Other embodiments of the invention can employ certain variations of design parameters for the lens while still operating on the same fundamental principles of the invention. For example, FIG. 4 shows a variant of the embodiments shown in FIG. 1-3. As in the previous embodiments, this embodiment includes two spherical surfaces S1 and S2 with centers C1 and C2 on optical axis 100 and two ellipsoidal surfaces E1 and E2 with foci F1, F1' and F2, F2', respectively, all on the optical axis, where F1=C1, F2=C2, and F1'=F2'. In contrast with the previously described embodiments, however, the spherical surface S1 has a smaller radius so that intersection point I1 is not directly above center C1. Consequently, $\sigma 1_{min}$ is increased and $\sigma 1_{max}$ is decreased, resulting in a smaller field of view as compared to the lenses described in FIGS. 1-3. Despite these differences, this embodiment can be used in much the same manner as the embodiments described above in relation to FIGS. 1-3. Although the field of view is reduced, this embodiment has the advantage of a smaller size. Another technique for reducing the size of the lens is to form the spherical surface S1 as two or more concentric spherical segments.

In this particular embodiment, ellipsoidal surfaces E1 and E2 can be characterized by their respective radius of curvatures (semi-latus rectums) R1 and R2 and their respective conic constants K1 and K2. In some cases it may be preferrable for surfaces E1 and E2 to have the same eccentricity (i.e., K1=K2) and their respective radius of curvatures R1 and R2 are in the proportion r1:r2. In particular, in some embodiments R1=r1 and R2=r2. FIG. 4 also shows the geometrical parameters L1, L2, L3, L4, L5, and L6, which are given below in terms of R1, R2, K1, and K2. These parameters represent the distance between foci, or between one focus and a vertex for the ellipsoids of revolution E1 and E2. These geometric distances are useful for constructing the dual viewpoint lens assembly in terms of the radii of curvatures R1, R2, and the conic constants K1, K2 that define the ellipsoidal surfaces E1 and E2 respectively and which also enforces the confocal condition: F1'=F2'.

$L1=R2[1-srt(-K2)]/[1+K2]$=Distance: Vertex of E2 to F2

$L2=2*R2[srt(-K2)]/[1+K2]$=Distance: F2 to F2'

$L3=R2[1+srt(-K2)]/[1+K2]$=Distance: Vertex of E2 to F2'

$L4=R1[1-srt(-K1)]/[1+K1]$=Distance: Vertex of E1 to F1

$L5=2*R1[srt(-K1)]/[1+K1]$=Distance: F1 to F1'

$L6=R1[1+srt(-K1)]/[1+K1]$=Distance: Vertex of E1 to F1'

Those skilled in the art will appreciate that various other design parameters may be altered as well, including sizes of the ellipsoidal surfaces, radii of curvature of the spherical refractive surfaces, additional light shaping surfaces, and so on. It will also be noted that points I1 and I2 are not necessarily collinear with focus F1'=F2', nor is the maximum field of view angle for both viewpoints the same. It should also be appreciated that the object points (i.e., such as point P in FIG. 1) may be light sources such as LEDs, illuminated pixels on a computer display, retroreflectors, or any illuminated or luminous objects, which may further be grouped to produce illuminated patterns of point objects, lines, or areas either in a plane or in three dimensional space.

It will also be appreciated that the lenses of the present invention can be used in an inverse manner, exchanging image and object, to project beams from a light source located at the position P' or P", thereby projecting a point image out into the environment to the position P. In such a case it is then possible to project a point light source located at position P' out into the environment to provide a point image at point P through SVP2 and also allow the reflected light at point P to be imaged through SVP1 to point P" on a detector. This would allow triangulation ranging to a non-luminous or non-illuminated object.

It will also be appreciated that the confocal condition F1'=F2' can be satified for dual viewpoint imaging even if the the three points F1, F2, and F1'=F2' are not colinear. In this case F1 may not lie on the axis defined by the two points F1'=F2' and F2. Such an asymmetric lens assembly would operate in the same manner as in the embodiments described above, but would not have a symmetric field of view about the optical axis defined by F1' and F2'. This asymmetric design may be advantageous in usage cases where a larger field of view is desired for a preferred viewing direction (i.e., a selected azimuthal viewing angle where a maximum field of view is desired) at the expense of having a smaller field of view at 180 degrees azimuthally opposed from such a preferred viewing direction.

The invention claimed is:

1. A dual viewpoint solid catadioptric lens comprising:
   a first spherical refractive surface S1 having a center C1 located on an optical axis of the lens and having a radius r1;
   a second spherical refractive surface S2 having a center C2 located on the optical axis of the lens and having a radius r2, wherein r2 is less than r1;
   a first ellipsoidal reflective surface E1 having foci F1 and F1' on the optical axis of the lens, wherein F1=C1;
   a second ellipsoidal partially reflective surface E2 having foci F2 and F2' on the optical axis of the lens, wherein F2=C2, and wherein F1'=F2', whereby C1 and C2 provide dual viewpoints for the lens.

2. The lens of claim 1 wherein the distance between C2 and C1 is less than r1.

3. The lens of claim 1 wherein S2 and E2 intersect at an angle $\sigma 1_{min}$ from the optical axis of the lens measured from C1.

4. The lens of claim 1 wherein S1 and E1 intersect at an angle $\sigma 1_{max}$ from the optical axis of the lens measured from C1.

5. The lens of claim 1 wherein S2 and E2 intersect at an angle $\sigma 2_{max}$ from the optical axis of the lens measured from C2.

6. The lens of claim 1 wherein a distance L1 between F2 and a vertex of E2 is $R2*[1-sqrt(-K2)]/[1+K2]$, a distance L2 between F2 and F2' is $2*R2[sqrt(-K2)]/[1+K2]$, and a distance L3 between F2' and the vertex of E2 is $R2[1+sqrt(-K2)]/[1+K2]$, where R2 is a radius of curvature of S2 and K2 is a conic constant of E2.

7. The lens of claim 1 wherein a distance L4 between F1 and a vertex of E1 is $R1*[1-sqrt(-K1)]/[1+K1]$, a distance L5 between F1 and F1' is $2*R1[sqrt(-K1)]/[1+K1]$, and a distance L6 between F1' and the vertex of E1 is $R1[1+sqrt(-K1)]/[1+K1]$, where R1 is a radius of curvature of S1 and K1 is a conic constant of E1.

8. The lens of claim 1 wherein E1 and E2 have equal eccentricities.

9. The lens of claim 1 wherein $\sigma 1_{max}=\pi/2$.

10. The lens of claim 1 wherein S1 and E1 intersect at an angle $\sigma 1_{max}$ from the optical axis of the lens measured from C1, wherein S2 and E2 intersect at an angle $\sigma 2_{max}$ from the optical axis of the lens measured from C2, and wherein $\sigma 1_{max} \neq \sigma 2_{max}$.

11. The lens of claim 1 wherein E1 and E2 have different eccentricities.

12. The lens of claim 1 wherein F1'=F2' is coincident with S2.

13. The lens of claim 1 wherein E2 has a semi-latus rectum R2 equal to r2.

14. The lens of claim 1 wherein E1 has a semi-latus rectum R1 equal to r1.

15. The lens of claim 1 wherein $\sigma 2_{max}=\pi/2$.

16. The lens of claim 1 wherein the lens is a solid body of revolution.

17. The lens of claim 1 wherein the lens is constructed from two or more sections.

18. The lens of claim 1 wherein an interior of the lens has a uniform index of refraction.

19. A dual viewpoint solid catadioptric lens comprising:

a first spherical refractive surface S1 having a center C1 located on an optical axis of the lens and having a radius r1;

a second spherical refractive surface S2 having a center C2 and having a radius r2, wherein r2 is less than r1;

a first ellipsoidal reflective surface E1 having foci F1 and F1' on the optical axis of the lens, wherein F1=C1;

a second ellipsoidal partially reflective surface E2 having foci F2 and F2', wherein F2=C2, and wherein F1'=F2', whereby C1 and C2 provide dual viewpoints for the lens.

* * * * *